United States Patent [19]
Gallant

[11] Patent Number: 6,026,842
[45] Date of Patent: Feb. 22, 2000

[54] FLOAT ACTIVATED SHUTOFF VALVE

[76] Inventor: Gerald Francis Gallant, 133, 52242 Range Road 215, Sherwood Park, Alberta, Canada, T8V 1B7

[21] Appl. No.: 09/182,400

[22] Filed: Oct. 29, 1998

[30] Foreign Application Priority Data

Aug. 14, 1998 [CA] Canada ................................. 2245082

[51] Int. Cl.[7] ............................. F16K 24/04; B01D 19/00
[52] U.S. Cl. ............................................ 137/202; 137/197
[58] Field of Search ..................................... 137/202, 197

[56] References Cited

U.S. PATENT DOCUMENTS

| 5,232,020 | 8/1993 | Mason et al. ....................... 137/614.04 |
| 5,529,086 | 6/1996 | Kasugai et al. ......................... 137/202 |

OTHER PUBLICATIONS

Wellmark Accessories product brochure, entitled "Fuel Gas Shut–off Valve", undated.

*Primary Examiner*—Gerald A. Michalsky
*Attorney, Agent, or Firm*—David and Bujold

[57] ABSTRACT

A fuel gas scrubber to remove liquids including a float activated shut off valve includes a pressure vessel with a dry gas outlet aperture extending through the top of the vessel as well as a wet gas inlet near the top of the vessel and a liquid outlet near the bottom of the vessel. The fuel gas scrubber including a float activated shut off valve also includes a valve seat positioned within an interior bore at a first end of a tubular housing. A float is encapsulated within the interior bore. The float is axially movable between the first end and a second end of the tubular housing. The float has a valve seat end facing the first end of the hosing and a liquid engaging end facing the second end of the tubular housing. A valve member is positioned on the valve seat end of the float. A liquids inlet is provided at the second end of the tubular housing. Liquids entering the tubular housing cause the float to move axially along the interior bore until the valve member engages the valve seat to seal the first end of the tubular housing. With the shut off valve, as described, the float is protected within the tubular housing.

9 Claims, 3 Drawing Sheets

FLOAT ACTIVATED SHUTOFF VALVE

FIELD OF THE INVENTION

The present invention relates to a float activated shutoff valve.

BACKGROUND OF THE INVENTION

There are numerous applications in which a float activated shut off valve is used, In such applications, a valve member is carried by a float against a valve seat when a liquid level reaches a predetermined height in a vessel or tank. By way of example, in the oil industry a quantity of natural gas is invariably produced by an oil well. It has become a common practise to use that natural gas. One way that the natural gas is used is as a fuel to operate on site equipment. Natural gas direct from the well is "wet", that is to say it contains quantities of condensible components which can form liquids during extraction and processing, including water, sulfides and higher hydrocarbons. The liquids may form as a separate phase or may be entrained in the natural gas in a finely dispersed state. The liquids which are present in the natural gas render it unsuitable for use as fuel, for wet gas can damage equipment, due to the presence of sulfides and higher hydrocarbons. The natural gas is, therefore, routed through a fuel gas scrubber to remove liquids. A fuel gas scrubber is a vessel that has a mixed gas and liquids inlet, a gas outlet and a liquid outlet. The gas outlet is in a normally open position, with gas being drawn for use, as required. The liquid outlet is in a normally closed position, with the result that liquids gradually accumulate within the vessel. The accumulated liquids are supposed to be periodically drained from the vessel via the liquid outlet. A float activated shutoff valve is used in the fuel gas scrubbers to shut off the flow of fuel gas should the liquid in the vessel rise above the predetermined level.

The float activated shutoff valves that have been used in fuel gas scrubbers consist of a valve member housing in which is positioned a valve member. A float is suspended from the valve member by means of a rod. The arrangement resembles a pendulum except that the movement is up and down along the axis of the rod. These float activated shutoff valves have experienced numerous problems. Fluids flowing into the vessel through the mixed gas and liquids inlet tend to strike the float that is hanging at the end of the rod. The force of the in flowing fluids acting against the float has been known to bend the rod, resulting in failure. The force of the in flowing fluids acting against the float has been known to detach the float from the rod, resulting in failure. The force of the in flowing fluids acting against the float has been known to physically damage the float, resulting in failure.

SUMMARY OF THE INVENTION

What is required is an alternative form of float activated shutoff valve that will be less prone to damage due to in flowing fluids.

According to the present invention there is provided a float activated shut off valve which includes a tubular housing having a first end, a second end, an exterior sidewall, an interior bore that extends from the first end to the second end. Means is provided on the exterior sidewall at the first end of the housing for suspending the tubular housing in a vessel positioned. A valve seat is positioned within the interior bore at the first end of the housing. A float is encapsulated within the interior bore. The float is axially movable between the first end and the second end of the housing. The float has a valve seat end facing the first end of the housing and a liquids engaging end facing the second end of the housing. A valve member is positioned on the valve seat end of the float. A liquids inlet is provided at the second end of the housing. Liquids entering the housing cause the float to move axially along the interior bore until the valve member carried by the float engages the valve seat to seal the first end of the housing.

With the float activated shut off valve, as described above, the float is protected by the housing, so there is no longer a risk of the float becoming physically damaged by the force of the incoming fluids. The use of a rod to suspend the float has been eliminated from the apparatus, so there is no longer a risk of failure due to a bent rod. The float is encapsulated within the housing, so there is no longer a risk of the float becoming detached and falling into the vessel.

Although beneficial results may be obtained through the use of the float activated shutoff valve, as described above, failures have occurred in the past when floats have collapsed due to too great a differential in external pressure acting upon the float as compared to internal pressure within the float. Even more beneficial results may, therefore, be obtained when the float is an inverted container. An inverted container such as a cup or bucket will float in liquid due to the fact that gas is trapped within it. The inverted container form of float has a quantity of gas trapped within it. More importantly, the internal pressure will always be substantially equal to the external pressure, thereby eliminating the risk of failure due to collapse of the float.

Although beneficial results may be obtained through the use of the float activated shutoff valve, as described above, the liquid level will eventually rise to the point where it closes off the inlet at the second end of the housing. Even more beneficial results may, therefore, be obtained when gas entry passages extend through the exterior sidewall of the housing spaced from the second end of the housing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
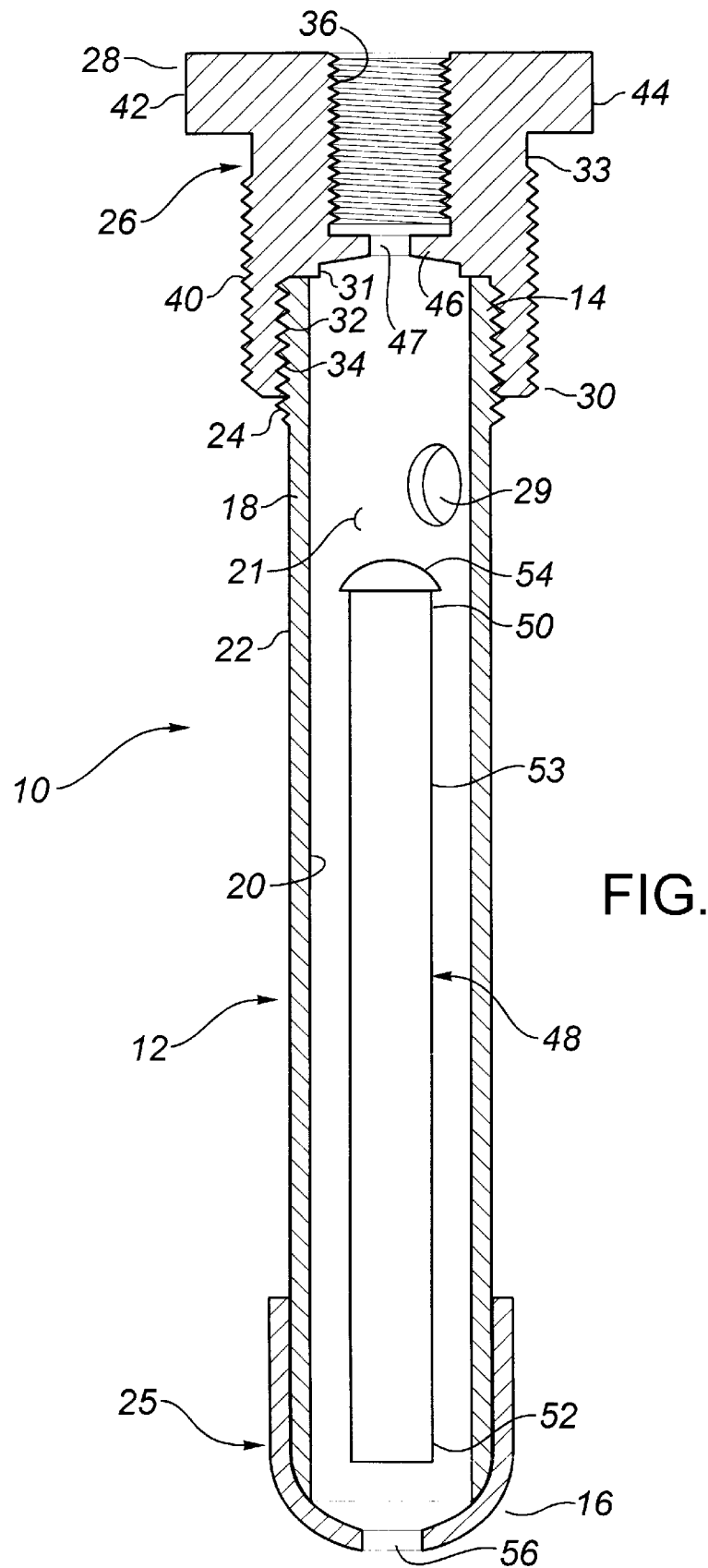
FIG. 1 is a side elevation view, in section, of a float activated shut off valve constructed in accordance with the teaching of the present invention.

The preferred embodiment, a float activated shut off valve generally identified by reference numeral 10, will now be described with reference to FIGS. 1 through 3.

Referring to FIG. 1, float activated shut off valve 10 includes a tubular housing 12 having a first end 14, a second end 16 and an exterior sidewall 18. An interior surface 20 of sidewall 18 which defines a bore 21 that extends from first end 14 to second end 16. An exterior surface 22 of sidewall 18 has threads 24 at first end 14. A first end cap 26 is positioned at first end 14. A second end cap 25 is positioned at second end 16. Second end cap 25 is secured in place by welding and has a liquids inlet 56 that allows liquids to enter tubular housing 12. Gas entry passages 29 extend through exterior sidewall 18 of housing 12 spaced from second end 16. First end cap 26 has a first end 28 and a second end 30, an interior surface 32 defining a bore 31 and an exterior surface 33. The interior surface 32 at second end 30 of the end cap 26 has internal threads 34. Threads 34 are mated to threads 24 on exterior surface 22 of sidewall 18 at first end 14 of tubular housing 12. Interior surface 32 at first end 28 of first end cap 26 has threads 36 to permit engagement of first end cap 26 with fuel gas piping. Exterior surface 33 at second end 30 of first end cap 26 has threads 40. A peripheral flange 42 extends from exterior sidewall 33 at first end 28 of end cap 26 adjacent to threads 40. Peripheral flange 42 has flat portions 44 thereby enabling a wrench to engage peripheral flange 42. A valve seat 46 is positioned within bore 31 of first end cap 26 around an orifice 47 which serves as an outlet from the valve 10. A float 48 is provided which is in the form of an inverted container. Float 48 has a closed first or valve seat end 50 and an open second or liquids engaging end 52. Float 48 is encapsulated within interior bore 21 of housing 12 between first end cap 26 and second end cap 25. The exterior diameter of float 48 is greater than interior diameter of liquids inlet 56 in second end cap 25, to prevent float 48 from falling out of second end 16 of housing 12. Float 48 is axially movable between the first end 14 and the second end 16 of the housing 12. First end 50 of float 48 faces first end 14 of housing 12 second end 52 of float 52 faces second end 16 of housing 12. A valve member 54 is positioned at first end 50 of float 48.

Figure 2:
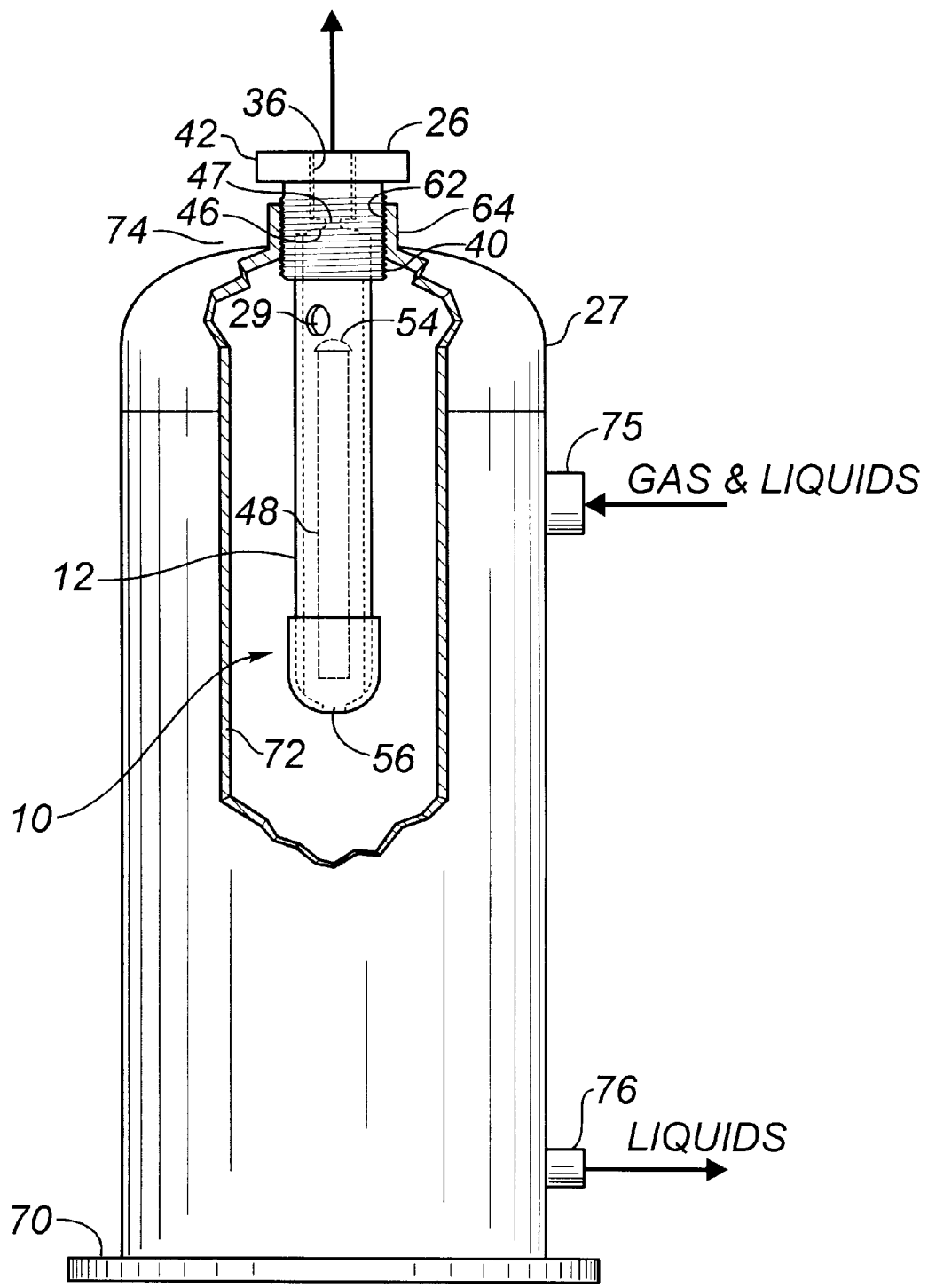
FIG. 2 is a side elevation view, in section of the float activated shut off valve illustrated in FIG. 1 positioned in a fuel gas scubber vessel, with the valve member spaced from the valve seat.
Figure 3:
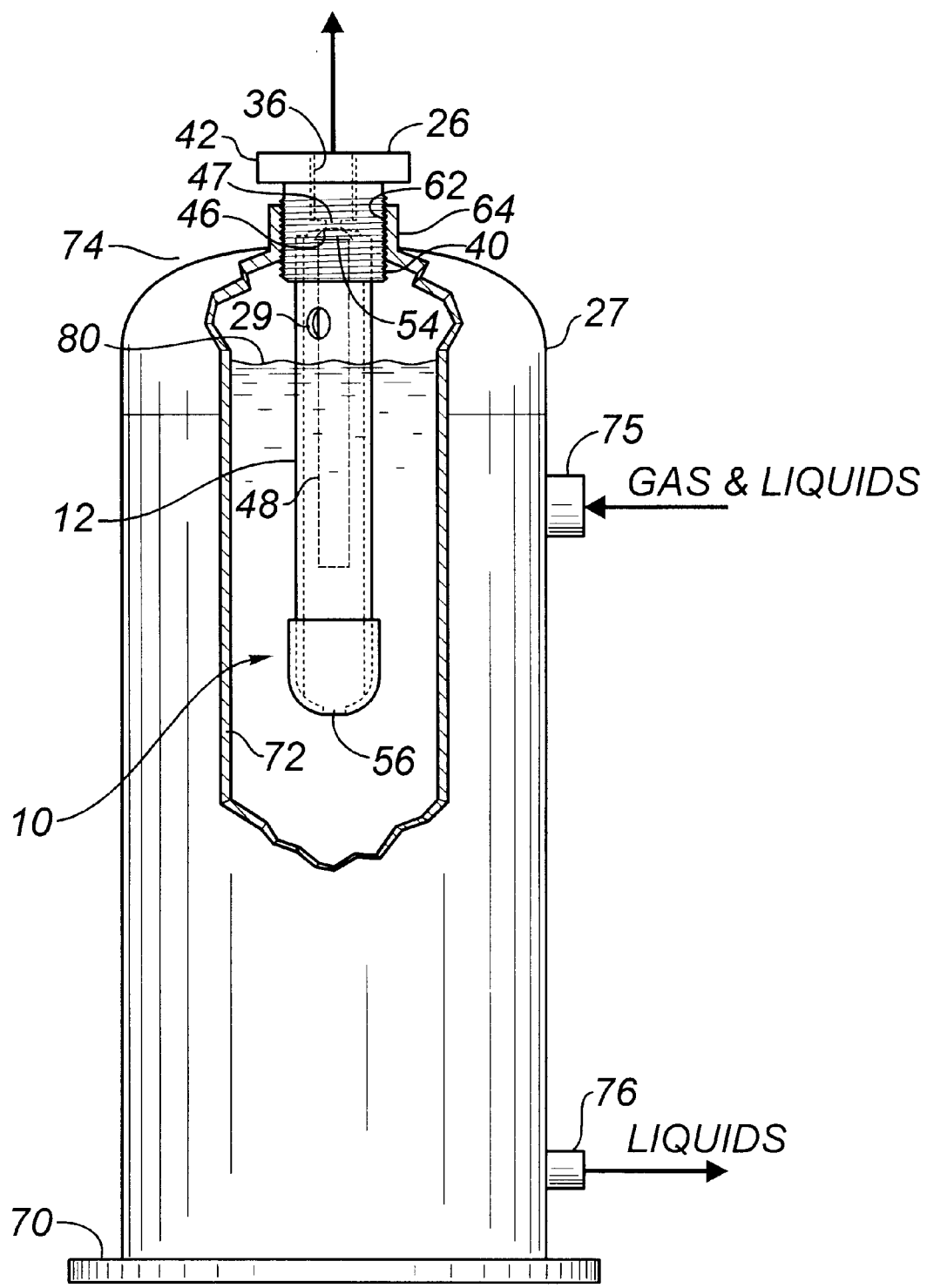
FIG. 3 is a side elevation view, in section of the float activated shut off valve illustrated in FIG. 1 positioned in a fuel gas scubber vessel, with the valve member engaging the valve seat.

With reference to FIGS. 2 and 3, there is illustrated a fuel gas scubber vessel 27. Fuel gas scrubber vessel 27 has a base 70, an exterior sidewall 72, and a top 74. A gas outlet aperture 64 is positioned at top 74 of vessel 27. Gas outlet apertures 64 has threads 62. Valve 10 is suspended in vessel 27 by engaging exterior threads 40 of first end cap 26 with mating threads 62 of aperture 64. Flat portions 44 on peripheral flange 42 can be engaged with a wrench (not shown) to screw valve 10 into position. Vessel 27 also has a mixed gas and liquids inlet 75 and a liquids outlet 76 that extend through exterior sidewall 72.

The use and operation of float activated shut off valve 10 will now be described with reference to FIGS. 1 through 3. Referring to FIGS. 2 and 3, orifice 47 is in a normally open position, with gas being drawn from vessel 27 for use as required. Liquid outlet 76 is in a normally closed position, with the result that liquids 78 gradually accumulate within vessel 27. Liquids 78 are periodically drained from vessel 27 via liquid outlet 76. Float activated shutoff valve 10 is used to shut off aperture orifice 47 should liquids 78 in vessel 27 rise above a predetermined level. In FIG. 2, float activated shut off valve 10 is positioned in a vessel 27 in which the level of accumulated liquids 78 is low. A mix of gas and liquids enters vessel 27 through inlet 75. In FIG. 2, the amount of liquids 78 in vessel 27 is sufficiently low that the liquids 78 do not engage float 48. Valve member 54 positioned on first end 50 of float 48 is, therefore, spaced from valve seat 46 and orifice 47 is open so that gas can exit vessel 27 to be used in equipment (not shown). Referring to FIG. 3, as level 80 of liquids 78 rises within vessel 27, liquids 78 from vessel 27 enter housing 12 of valve 10 through inlet 56 in second end cap 25. The entry of liquids causes float 48 to rise axially along interior bore 21 of housing 12. When valve member 54 carried on first end 50 of float 48 engages valve seat 46 it closes orifice 47 in first end cap 26 at first end 14 of housing 12. Liquids 78, which would otherwise cause damage to equipment, are thereby prevented from exiting vessel 27 through orifice 47.

The float 48 within the activated shut off valve 10, as described above, is protected by the housing 12, so there is no longer a risk of the float 48 becoming physically damaged by the force of the incoming fluids. The use of a rod to suspend the float has been eliminated from the apparatus, so there is no longer a risk of failure due to a bent rod. The float 48 is encapsulated within the housing 12, so there is no longer a risk of the float 48 becoming detached and falling into the vessel 27. Float 48 is in the form of an inverted container. The inverted container form of float ensures that it will float in liquids 78 due to the fact that air (natural gas) is trapped within the float 48. Importantly, the internal pressure will always be substantially equal to the external pressure, thereby eliminating the risk of failure due to collapse of the float 48.

It will be apparent to one skilled in the art that, although in the illustrated embodiment end cap 26 is secured to tubular housing 12 by mating threads, end cap 26 could be secured to tubular housing 12 in other ways such as by interference fit, welding or adhesive. It will similarly be apparent to one skilled in the art that, although in the illustrated embodiment second end cap 25 is secured in place by welding, second end cap 25 could be secured to tubular housing 12 in other ways such as by mating threads, interference fit or adhesive. It will similarly be apparent to one skilled in the art that, although the illustrated embodiment has threads to permit engagement of first end cap 26 with gas piping, the connection to gas piping could alternatively be achieved in other ways such as through a flange to flange coupling with a gasket disposed in between. It will also be apparent to one skilled in the art that the extent to which tubular housing 12 extends into vessel 27 can be limited by a tapering of the thread, a limiting flange, or by other means. It will finally be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A fuel gas scrubber for removing liquids, the fuel gas scrubber comprising:

a pressure vessel having a base, an exterior sidewall and a top;

a dry gas outlet aperture extending through the top of the vessel for facilitating exhaust of gases from the vessel, a wet gas inlet extending through the exterior sidewall of the vessel, a liquid outlet extending through the exterior sidewall of the vessel, and the wet gas inlet being located between the top and the base;

a tubular housing having a first end, an opposed second end, an exterior sidewall, and an interior bore extending from the first end to the second end;

the first end of the tubular housing being secured to the dry gas outlet aperture in the top of the vessel to facilitate communication therewith, and the tubular housing being suspended within the vessel and extending toward the base such that the second end of the tubular housing is locate closer to the base than the wet gas inlet;

a valve seat being positioned within the interior bore adjacent the first end of the tubular housing;

a float being encapsulated within the interior bore of the tubular housing and being protected, via the exterior sidewall of the tubular housing, from an entry force of any wet gases entering the vessel through the wet gas inlet, the float being axially movable between the first end and the second end of the tubular housing, and the float having a valve seat end facing the first end of the tubular housing and a fluid engaging end facing the second end of the tubular housing;

a valve member being positioned on the valve seat end of the float; and an inlet at the second end of the tubular housing, such that any fluid entering the tubular housing causes the float to move axially along the interior bore until the valve member carried by the float engages the valve seat to seal the first end of the tubular housing.

2. The fuel gas scrubber according to claim 1, wherein the float is an inverted container.

3. The fuel gas scrubber according to claim 1, wherein at least one gas entry passage extends through the exterior sidewall of the tubular housing, and the at least one gas entry passage is spaced from the second end of the tubular housing.

4. The fuel gas scrubber according to claim 1, wherein the tubular housing is secured to the vessel via threads provided on the exterior sidewall of the tubular housing and a mating thread is provided within the dry gas outlet aperture, and a peripheral flange extends from the exterior sidewall of the tubular housing, adjacent to the threads on the exterior sidewall, to provide a surface which can be engaged by a wrench to facilitate securing the tubular housing to the vessel.

5. The fuel gas scrubber according to claim 1, wherein the valve seat end of the float is generally convex and the valve seat is generally concave to facilitate mating sealing engagement therebetween.

6. A fuel gas scrubber according to claim 1, wherein the liquid outlet extends through the exterior sidewall, sufficiently closed to the base, to facilitate draining of substantially all of the liquid contained within the vessel once the vessel is filled to a liquid level adjacent the wet gas inlet.

7. A fuel gas scrubber for removing liquids, the fuel gas scrubber comprising:

a pressure vessel having a base, an exterior sidewall and a top;

a dry gas outlet aperture extending through the top of the vessel for facilitating exhaust of gases from the vessel, a wet gas inlet extending through the exterior sidewall of the vessel, a liquid outlet extending through the exterior sidewall of the vessel adjacent the base, and the wet gas inlet being located between the top and the base;

a tubular housing having a first end, an opposed second end, an exterior sidewall, and an interior bore extending from the first end to the second end;

the tubular housing having exterior threads provided on the exterior sidewall of the tubular housing, adjacent the first end, and the dry gas outlet aperture having a mating pair of threads provided therein to facilitate attachment and communication between the first end of the tubular housing with the dry gas outlet aperture in the top of the vessel, the tubular housing being suspended within the vessel and extending toward the base such that the second end of the tubular housing is locate closer to the base than the wet gas inlet; and a peripheral flange extending from the exterior sidewall of the tubular housing, adjacent to the threads on the exterior sidewall, provides a surface which can be engaged by a wrench to facilitate securing the tubular housing to the vessel;

a valve seat being positioned within the interior bore adjacent the first end of the tubular housing;

a float being encapsulated within the interior bore of the tubular housing and being protected, via the exterior sidewall of the tubular housing, from an entry force of any wet gases entering the vessel through the wet gas inlet, the float being axially movable between the first end and the second end of the tubular housing, and the float having a valve seat end facing the first end of the tubular housing and a fluid engaging end facing the second end of the tubular housing;

a valve member being positioned on the valve seat end of the float; and an inlet at the second end of the tubular housing, such that any fluid entering the tubular housing causes the float to move axially along the interior bore until the valve member carried by the float engages the valve seat to seal the first end of the tubular housing.

8. A fuel gas scrubber according to claim 7, wherein the liquid outlet extends through the exterior sidewall, sufficiently closed to the base, to facilitate draining of substantially all of the liquid contained within the vessel once the vessel is filled to a liquid level adjacent a level of the wet gas inlet.

9. A fuel gas scrubber for removing liquids, the fuel gas scrubber comprising:

a pressure vessel having a base, an exterior sidewall and a top;

a dry gas outlet aperture extending through the top of the vessel for facilitating exhaust of gases from the vessel, a wet gas inlet extending through the exterior sidewall of the vessel for supplying a wet gas to be scrubbed, a liquid outlet extending through the exterior sidewall of the vessel for exhausting liquids, and the wet gas inlet being located between the top and the base;

a tubular housing having an exterior sidewall, a first end and an opposed second end, and an interior bore extending from the first end to the second end;

the first end of the tubular housing being secured to the dry gas outlet aperture in the top of the vessel to facilitate communication therewith, and the tubular housing being suspended within the vessel and extending toward the base such that the second end of the tubular housing is locate closer to the base than the wet gas inlet;

a valve seat being positioned within the interior bore adjacent the first end of the tubular housing;

a float being encapsulated within the interior bore of the tubular housing and being protected, via the exterior sidewall of the tubular housing, from an entry force of any wet gases entering the vessel through the wet gas inlet, the float being axially movable between the first end and the second end of the tubular housing, and the float having a valve seat facing the first end of the tubular housing and a fluid engaging end facing the second end of the tubular housing;

a valve member being positioned on the valve seat end of the float; and an inlet at the second end of the tubular housing being located such that any liquid entering the tubular housing causes the float to move axially along the interior bore until the valve member carried by the float engages the valve seat to seal the first end of the tubular housing and prevent a flow therethrough.

* * * * *